United States Patent
Jiang et al.

(10) Patent No.: US 10,938,484 B2
(45) Date of Patent: Mar. 2, 2021

(54) MONITORING PERFORMANCE OF OPTICAL NETWORK USING LOW-POWER GAPS AND A PILOT TONE

(71) Applicant: HUAWEI TECHNOLOGIES CO., LTD., Guangdong (CN)

(72) Inventors: Zhiping Jiang, Kanata (CA); Xuefeng Tang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/586,392

(22) Filed: Sep. 27, 2019

(65) Prior Publication Data

US 2020/0112376 A1 Apr. 9, 2020

Related U.S. Application Data

(60) Provisional application No. 62/741,808, filed on Oct. 5, 2018.

(51) Int. Cl.
*H04B 10/08* (2006.01)
*H04B 10/61* (2013.01)
(Continued)

(52) U.S. Cl.
CPC ... *H04B 10/6163* (2013.01); *H04B 10/07953* (2013.01); *H04B 10/07955* (2013.01); *H04J 14/0276* (2013.01)

(58) Field of Classification Search
CPC ............ H04B 10/6163; H04B 10/6161; H04B 10/616; H04B 10/69; H04B 10/07955;
(Continued)

(56) References Cited

U.S. PATENT DOCUMENTS 4,918,396 A 4/1990 Halemane et al.
7,426,350 B1 * 9/2008 Sun .................. H04B 10/25137
398/159

(Continued)

FOREIGN PATENT DOCUMENTS

| CN | 102904635 A | 1/2013 |
| CN | 105684328 A | 6/2016 |
| EP | 1049273 A2 | 11/2000 |

OTHER PUBLICATIONS

Jiang, Zhiping et al. Nonlinear Noise Monitoring in Coherent Systems Using Amplitude Modulation Pilot Tone and Zero-Power Gap, OFC 2019. total 3 pages.
(Continued)

*Primary Examiner* — Hanh Phan
(74) *Attorney, Agent, or Firm* — BCF LLP

(57) ABSTRACT

The disclosed systems, structures, and methods are directed to monitoring performance of optical networks. Transmitted and received optical channel signal has both low-power gaps and an amplitude modulation pilot tone applied. The low-power gaps are applied at a gap frequency with gap power being lower than a signal power of the optical channel signal. The pilot tone is applied to the optical channel signal at a pilot tone modulation frequency, which is different from the gap frequency. Described methods include determining pilot tone modulation depth based on detected gap power in low-power gaps of the received optical channel signal. Amplifier spontaneous emission and nonlinear noise in optical link are detected separately. This permits determining and monitoring of optical signal-to-noise ratio.

25 Claims, 12 Drawing Sheets

(51) Int. Cl.
*H04J 14/02* (2006.01)
*H04B 10/079* (2013.01)

(58) Field of Classification Search
CPC .......... H04B 10/07953; H04B 10/0775; H04B 10/0773; H04B 10/0795; H04B 10/40; H04J 14/021; H04J 14/0276
USPC ..... 398/33, 38, 202, 208, 209, 158, 159, 25, 398/26, 27, 30, 31, 32, 193, 194, 147, 81, 398/183, 188, 204, 205, 207, 136
See application file for complete search history.

(56) References Cited

U.S. PATENT DOCUMENTS

| | | | |
|---|---|---|---|
| 2003/0002098 A1* | 1/2003 | Carrick | H04J 14/0221 398/5 |
| 2015/0215038 A1 | 7/2015 | Jiang et al. | |
| 2015/0222354 A1* | 8/2015 | Shang | H04B 10/25891 398/26 |

OTHER PUBLICATIONS

Ji, H.C. et al. Optical performance monitoring techniques based on pilot tones for WDM network applications, vol. 3, No. 7 / Journal of Optical Networking, Jul. 2004. pp. 510-533.

Wu, Feilong et al. QPSK Training Sequence-Based Both OSNR and Chromatic Dispersion Monitoring in DWDM Systems, IEEE Photonics Journal vol. 10, No. 4, Aug. 2018. total 11 pages.

Dou et al., Differential Pilots Aided In-Band OSNR Monitor With Large Nonlinear Tolerance, OFC/OSA 2015.

Wang et al., Intelligent Constellation Diagram Analyzer Using Convolutional Neural Network-Based Deep Learning, Optics Express 17150, Jul. 24, 2017, vol. 25, No. 15.

* cited by examiner

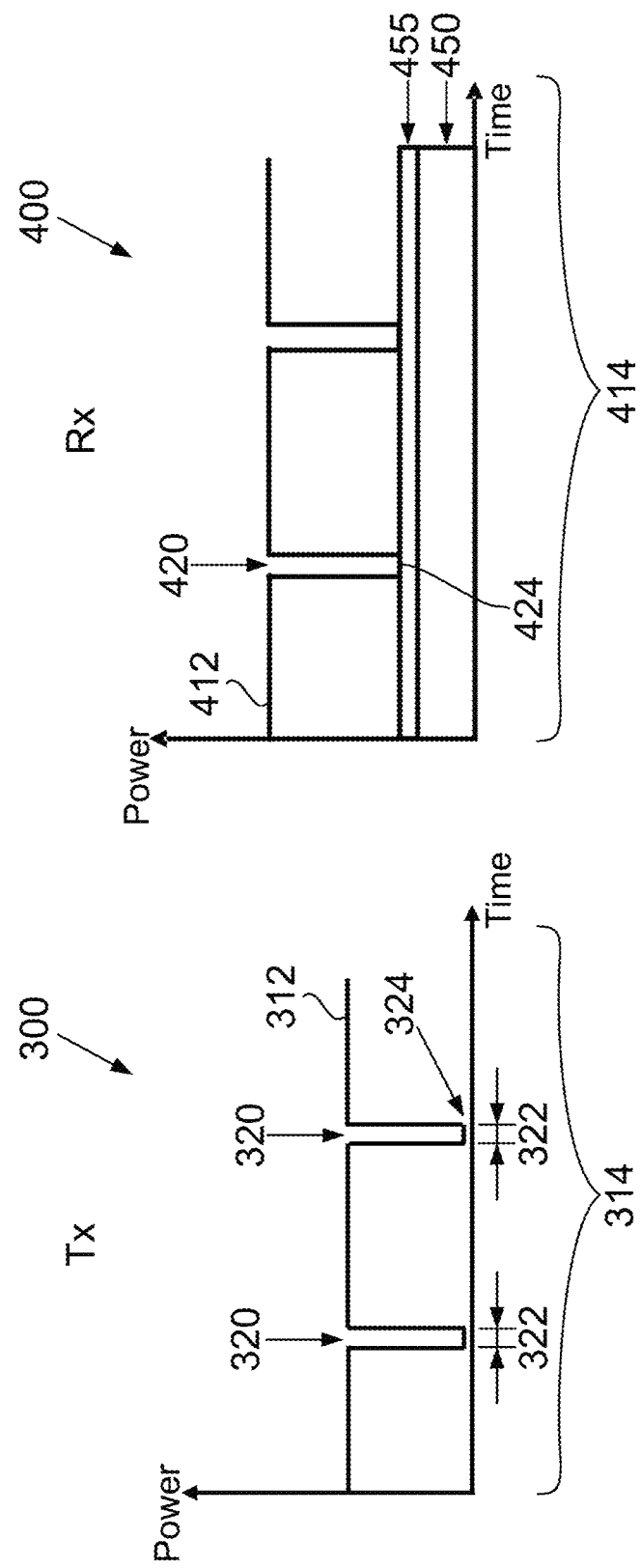

MONITORING PERFORMANCE OF OPTICAL NETWORK USING LOW-POWER GAPS AND A PILOT TONE

CROSS-REFERENCE TO RELATED APPLICATIONS

This application claims the benefit of priority to U.S. Patent Application Ser. No. 62/741,808 filed Oct. 5, 2018 and entitled "Monitoring Performance of Optical Network using Low-Power Gaps and a Pilot Tone", the contents of which are incorporated herein by reference.

FIELD OF THE INVENTION

The present disclosure generally relates to the field of optical networks and, in particular, to monitoring performance of the optical networks.

BACKGROUND

A typical optical network, for example a dense wavelength division multiplex (DWDM) network, has many passive and active components. Each of these components may add noise to a propagating optical channel signal. Monitoring noise levels at each component separately may help to detect and analyze particular sources of the noise. The information obtained from such monitoring may be used to address or compensate for sources of noise and may allow for improving the performance of the optical network.

Optical signal-to-noise ratio (OSNR) is one of the most important signal quality parameters in the optical communication system. It may be advantageous to provide improved OSNR monitoring techniques that are any or all of low cost, accurate, easy to use and non-intrusive.

SUMMARY

An object of the present disclosure is to provide a technique to monitor performance of an optical network and in particular of optical network equipment.

In accordance with this objective, an aspect of the present disclosure provides methods, systems and apparatuses for transmitting and receiving an optical channel signal having low-power gaps and a pilot tone, and performing optical network equipment monitoring based on such low-power gap and the pilot tone.

When propagating through optical network equipment, an optical channel signal may accumulate noise from equipment of the optical network.

Noise in optical signal transmitted through the optical network includes noise caused by optical amplifiers and nonlinear noise. The noise caused by the optical amplifiers is a so-called amplifier spontaneous emission (ASE) noise. Nonlinear noise is caused by fiber nonlinear interference (NLI) and is one of the most important impairments of coherent optical communication systems.

Optical signal-to-noise ratio (OSNR) of the optical channel signal is usually monitored in the optical networks. In order to measure OSNR, ASE noise needs to be detected and analyzed separately from the nonlinear noise.

The technology as disclosed herein permits monitoring ASE noise and nonlinear noise separately.

The technology as disclosed herein also permits monitoring OSNR. The technology as described herein may be low-cost, accurate, and fast and provide real-time measurement monitoring data of OSNR. The technology permits using the advantages of amplitude modulation pilot tone and coherent digital signal processing (DSP).

According to one aspect of the disclosed technology, there is provided a method for monitoring performance of optical network. The method comprises receiving an optical channel signal. The optical channel signal comprises low-power gaps, gap power in the low-power gaps being at least five times lower than a signal power of the optical channel signal. The low-power gaps may be applied and detected at a gap frequency. The optical channel signal also comprises an amplitude modulation pilot tone having a pilot tone modulation frequency. The pilot tone modulation frequency may be different from the gap frequency. The method further comprises monitoring performance of fiber optical network equipment based on the amplitude of the pilot tone detected from the gap power in the low-power gaps of the received optical channel signal.

In accordance with additional aspects of the present disclosure, there is provided another method for monitoring performance of optical networks. The method comprises receiving an optical channel signal. The optical channel signal comprises low-power gaps, gap power in low-power gaps being at least five times lower than a signal power of the optical channel signal. The optical channel signal also comprises an amplitude modulation pilot tone. The low-power gaps may have a gap frequency and the amplitude modulation pilot tone may have a pilot tone modulation frequency. The pilot tone modulation frequency may be different from the gap frequency. The method further comprises removing chromatic dispersion from the optical channel signal and monitoring an optical signal-noise-ratio of the optical channel signal based on the amplitude of the pilot tone detected in low-power gaps of the optical channel signal with removed chromatic dispersion.

In accordance with other aspects of the present disclosure, there is provided an optical network monitoring apparatus. The apparatus comprises a receiver and a processor. The receiver is configured to receive an optical channel signal comprising: low-power gaps, a gap power in the low-power gaps being at least five times lower than a signal power of the optical channel signal, and an amplitude modulation pilot tone applied to the optical channel signal at a pilot tone modulation frequency. The low-power gaps may have gap frequency. The pilot tone modulation frequency may be different from the gap frequency. The processor is configured to monitor performance of optical network equipment based on the amplitude of the pilot tone detected from the gap power of the received optical channel signal. The receiver may be a coherent receiver.

In accordance with other aspects of the present disclosure, there is provided a non-transitory computer readable medium with computer executable instructions stored thereon that, when executed by a processor, cause the processor to determine gap power in low-power gaps of an optical channel signal; obtain the amplitude of the pilot tone based on the power in the gap (also referred to as gap power); and monitor performance of optical network equipment based on the amplitude of the pilot tone and the power in low-power gaps of the optical channel signal. The optical channel signal comprises low-power gaps, power in the low-power gaps being at least five times lower than a signal power of the optical channel signal. The optical channel signal also comprises an amplitude modulation pilot tone applied to the optical channel signal at a pilot tone modulation frequency. The low-power gaps may have gap frequency. The pilot tone modulation frequency may be different from the gap frequency.

In at least one embodiment, the pilot tone modulation frequency is lower than the gap frequency.

The amplitude modulation pilot tone and pilot tone modulation amplitude may be detected using fast Fourier transform.

In at least one embodiment, chromatic dispersion is removed from the optical channel signal before detecting the pilot tone modulation amplitude. The processor may be configured to remove chromatic dispersion from the optical channel signal.

In at least one embodiment, the gap power is between about 5% and about 10% of the signal power of the optical channel signal. The gap power may be about 5% or lower than 5% of the signal power of the optical channel signal.

Monitoring performance of the fiber optical network equipment may comprise monitoring an optical signal-to-noise ratio. In some embodiments, in addition to making use of information associated with the power in the low power gaps, the optical signal-noise-ratio may be calculated by using data of received optical channel signal outside of the low-power gaps.

Monitoring performance of the fiber optical network equipment may comprise monitoring of amplifier spontaneous emission (also referred to herein as ASE noise). Monitoring performance of the fiber optical network equipment may comprise monitoring of fiber nonlinear noise.

BRIEF DESCRIPTION OF THE FIGURES

The features and advantages of the present disclosure will become apparent from the following detailed description, taken in combination with the appended drawings, in which:

FIG. 3 depicts a transmitted waveform of optical power with low-power gaps;

FIG. 4 depicts a received waveform of optical power after the optical signal with waveform of FIG. 3 propagated through the link;

Figure 1:
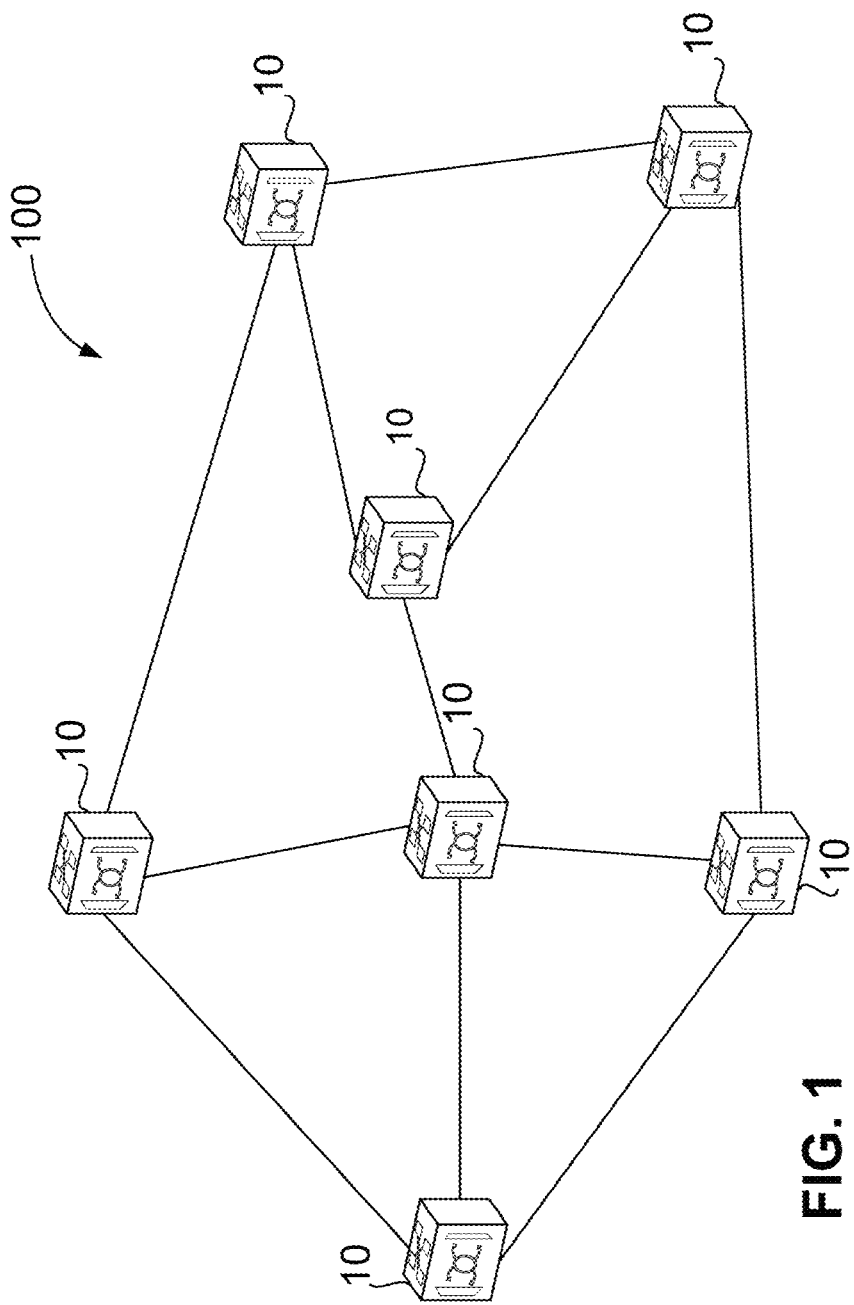
FIG. 1 (Prior Art) depicts a block diagram of an optical network.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain to.

The instant disclosure is directed to a method and apparatus to address the deficiencies of the current state of the art. In particular, the instant disclosure describes systems, apparatuses and methods for monitoring performance of fiber optical networks.

Generally, embodiments of the present disclosure provide methods and apparatuses for transmitting, receiving and using an optical channel signal to monitor performance of an optical network based on low-power gaps and pilot tone both applied to the optical channel signal.

Referring now to the drawings, FIG. 1 depicts a block diagram of an optical network 100. Such optical network 100 typically has a plurality of nodes, each node may include an optical add-drop multiplexer, such as a reconfigurable optical add-drop multiplexer (ROADM) 10, having at least one wavelength selective switch (WSS). The optical network 100 may also have one or more laser light sources.

The optical network 100 typically includes a plurality of optical amplifiers, e.g. erbium-doped fiber amplifiers (EDFAs), for amplifying optical signals. The light sources and optical amplifiers are omitted in FIG. 1 for simplicity.

The optical network equipment, as referred to herein, comprises one or more passive and/or active optical network components and/or modules of the optical network 100, including, but not limited to, optical fiber, optical amplifiers, optical filters, optical links, WSSs, arrayed waveguide gratings, and laser light sources.

Nodes 10 within the optical network 100 typically transmit signals on one of a plurality of optical wavelength channels. Throughout the present disclosure, the term "wavelength channels" denotes modulated optical signals at particular wavelengths. Wavelength channels are also referred to herein as "channels". Each channel is characterized by a channel bandwidth and a channel central frequency, typically defined by a frequency grid.

As referred to herein, the term "transmitted optical channel signal" refers to an optical channel signal before propagating through the optical network equipment. As referred to herein, the term "received optical channel signal" refers to an optical channel signal after propagating through the optical network equipment.

In the optical network 100, an amplitude modulation pilot tone signal may be used to monitor the channel power. The "amplitude modulation pilot tone" (also referred to herein as "pilot tone") is a low-frequency (e.g. kHz to MHz) modulation of the intensity of the pilot tone applied to a high-speed optical channel.

The modulation depth of the pilot tone is usually small (e.g. a few percent of the channel power). The pilot tone provides an in-band ancillary channel for performance monitoring.

Each channel can be modulated with a different pilot tone. For example, different modulation frequencies may be applied to different channels. Different spreading sequences may also be applied to spectra-spread pilot tones. Accordingly, a power of a particular pilot tone may be used for indicating the power of the high-speed optical channel in a wavelength division multiplexed (WDM) system. The pilot tone may be further modulated to carry channel characterizing information.

Figure 2:
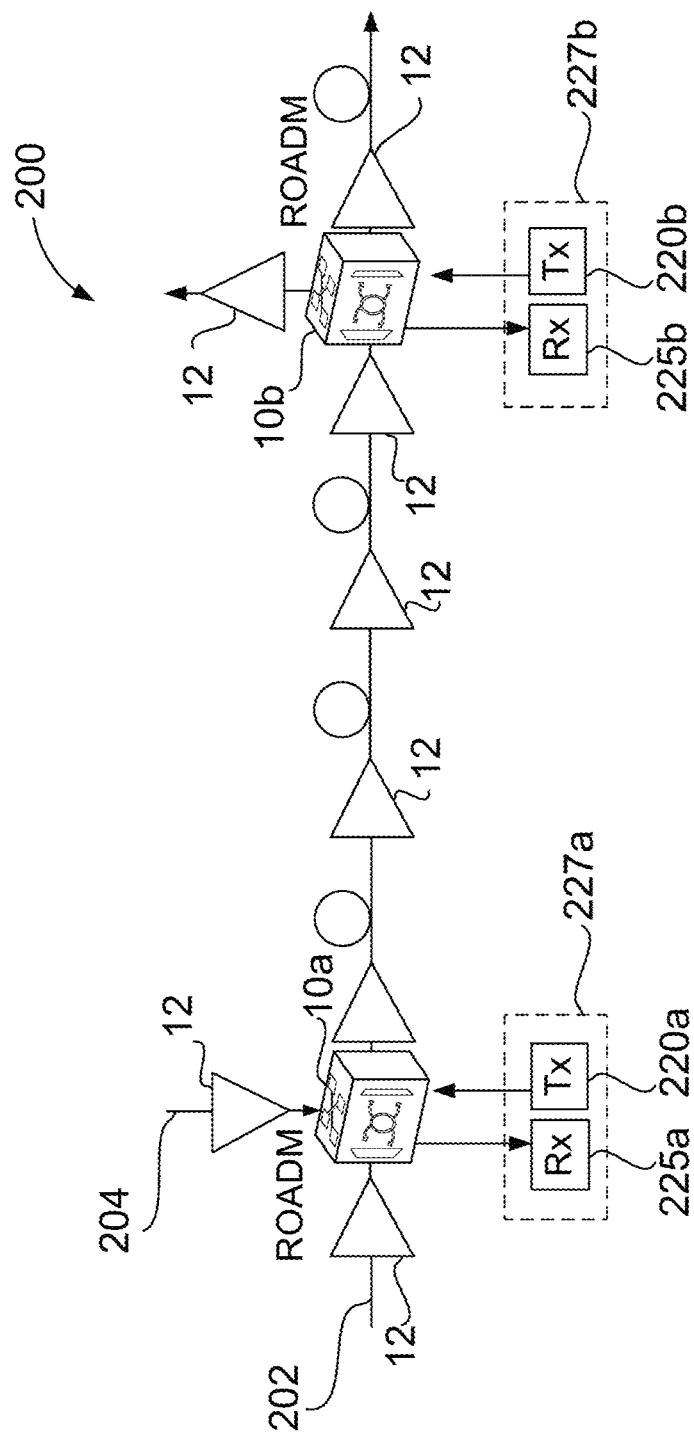
FIG. 2 depicts a block diagram of a link between two reconfigurable optical add-drop multiplexers (ROADMs)

FIG. 2 illustrates more details of a link 200 between two ROADMs 10 of FIG. 1. One ROADM 10 of FIG. 2 can receive one or more DWDM signals 202, 204, drop one or more channels from DWDM signals 202, 204 at a receiver Rx, add one or more channels generated by a transmitter Tx, and pass through other channels. The signals may be added or dropped using a WSS (not shown). A transmitter Tx includes a laser light source (not shown). In some cases, dropped channels are converted from optical to electrical domain, and added channels are converted from electrical to optical domain. Otherwise, channels are switched or passed through in the optical domain. It should be noted that a coherent transceiver 227a, 227b may include transmitter Tx 220a, 220b and receiver Rx 225a, 225b.

The link 200 also includes a plurality of optical amplifiers 12, e.g. EDFAs. Each optical amplifier 12 introduces noise to the optical channel signal. Such noise is related to amplifier spontaneous emission (ASE) and is referred to as "ASE noise". The ASE noise contributes to a total link noise. Monitoring of the total link noise may be performed to obtain a metric of a health condition in the network.

In addition to the ASE noise, fiber nonlinear noise is also a contribution to the total link noise. Fiber nonlinear noise is related to two major fiber nonlinearities in coherent fiber optical communication systems. Such fiber nonlinearities are self-phase modulation (SPM) and cross-phase modulation (XPM). SPM is the nonlinear effect caused by the signal itself as it propagates within the channel. XPM is the nonlinear effect on a signal carried within a channel caused by signals carried within the neighboring channels. The NLI caused by SPM/XPM behaves like additional noise and is often referred to as fiber nonlinear noise (also referred to herein as "nonlinear noise").

Nonlinear noise is an important impairment in coherent optical communication systems. Monitoring of the nonlinear noise in optical network operation is important for channel power optimization, fault localization, etc.

Existing methods and systems for monitoring fiber nonlinear noise have various limitations and drawbacks.

Optical signal-to-noise ratio (OSNR) qualifies the degree of optical noise interference on optical signals. OSNR is determined as a ratio of the power of optical channel signal to the power of the noise affecting the signal within a given bandwidth:

$$OSNR(\text{dB}) = 10 lg\left(\frac{P_i}{N_i}\right) + 10 lg\left(\frac{B_m}{B_r}\right), \quad (1)$$

where $P_i$ is signal power in the i-th channel, $B_m$ is equivalent noise bandwidth, $N_i$ is the noise power introduced within the $B_m$, $B_r$ is the reference optical bandwidth, which is usually 0.1 nm. It should be understood that in many implementations, $N_i$ is treated as only the ASE noise, as the OSNR value is determined over a length of 0.1 nm.

OSNR is one of the most important parameters in transmission of the optical signal via the optical link and the optical network in general. Optical amplifiers are used in optical networks to compensate for various losses, such as fiber loss, and other component losses. OSNR, however, is degraded due to amplifications. While OSNR measurement is carried out for a number of reasons, including fault cause assessment and health monitoring. This information may be used to improve network performance. OSNR should take into account ASE noise and not the nonlinear noise. However, total noise, that is usually measured, includes both ASE noise and nonlinear noise.

Therefore, for monitoring optical networks performance, it is important to have systems and methods for monitoring of the nonlinear noise separately from ASE noise. Such methods and systems are also important when monitoring OSNR of the optical networks.

FIG. 3 depicts optical power of a transmitted waveform 300. The optical channel signal with waveform 300 may be transmitted for example, by transmitter Tx 220a depicted in FIG. 2.

In FIG. 3, transmitted optical signal 310 has transmitted signal power 312 over a monitoring time period 314. The transmitted waveform 300 has low-power gaps 320 during gap time periods 322. Transmitted gap power 324 is much lower than transmitted signal power 312 outside of low-power gaps 320.

FIG. 4 depicts optical power of a received waveform 400. The optical channel signal with waveform 400 may be, for example, received by receiver Rx 225b depicted in FIG. 2.

In FIG. 4, received waveform 400 has received signal power 412 over monitoring time period 414. Low-power gaps 420 received during gap time periods 422 have received gap power 424. The received gap power 424 is much lower than received signal power 412 outside of low-power gaps 420.

As discussed above, ASE noise and nonlinear noise are added to the signal during propagation through the link.

It should be noted that the nonlinear noise is present in low-power gaps 420 of the received waveform 400 due to spreading of signal symbols into neighboring signal symbols during propagation. The low-power gap 420 may disappear after propagation in link 200 due to chromatic dispersion. This may happen if low-power gap 420 is much narrower than the symbol spreading scale. After chromatic dispersion is removed digitally in the coherent receiver, low-power gaps 420 reappear as depicted in FIG. 4.

FIG. 4 illustrates that received waveform 400 has ASE noise 450 and fiber nonlinear noise 455 introduced by fiber nonlinearity. These noise levels are generally additive to the signals. As such, received signal power 412 includes contributions from ASE noise 450 and fiber nonlinear noise 455. The contribution of ASE noise 450 and fiber nonlinear noise 455 also forms a power level in the lower power gaps 420. If corresponding transmitted gap power 324 is approximately 0, the received gap power 424 represents total link noise.

Measuring the received gap power 424 in the low-power gap 420 provides an estimate or measure of the total noise power added to the optical signal during propagation through link 200.

In order to monitor ASE noise and nonlinear noise separately, an amplitude modulation pilot tone can be applied to the optical channel signal, in addition to applying a low-power gap. Application of the pilot tone will now be described.

Figure 5:
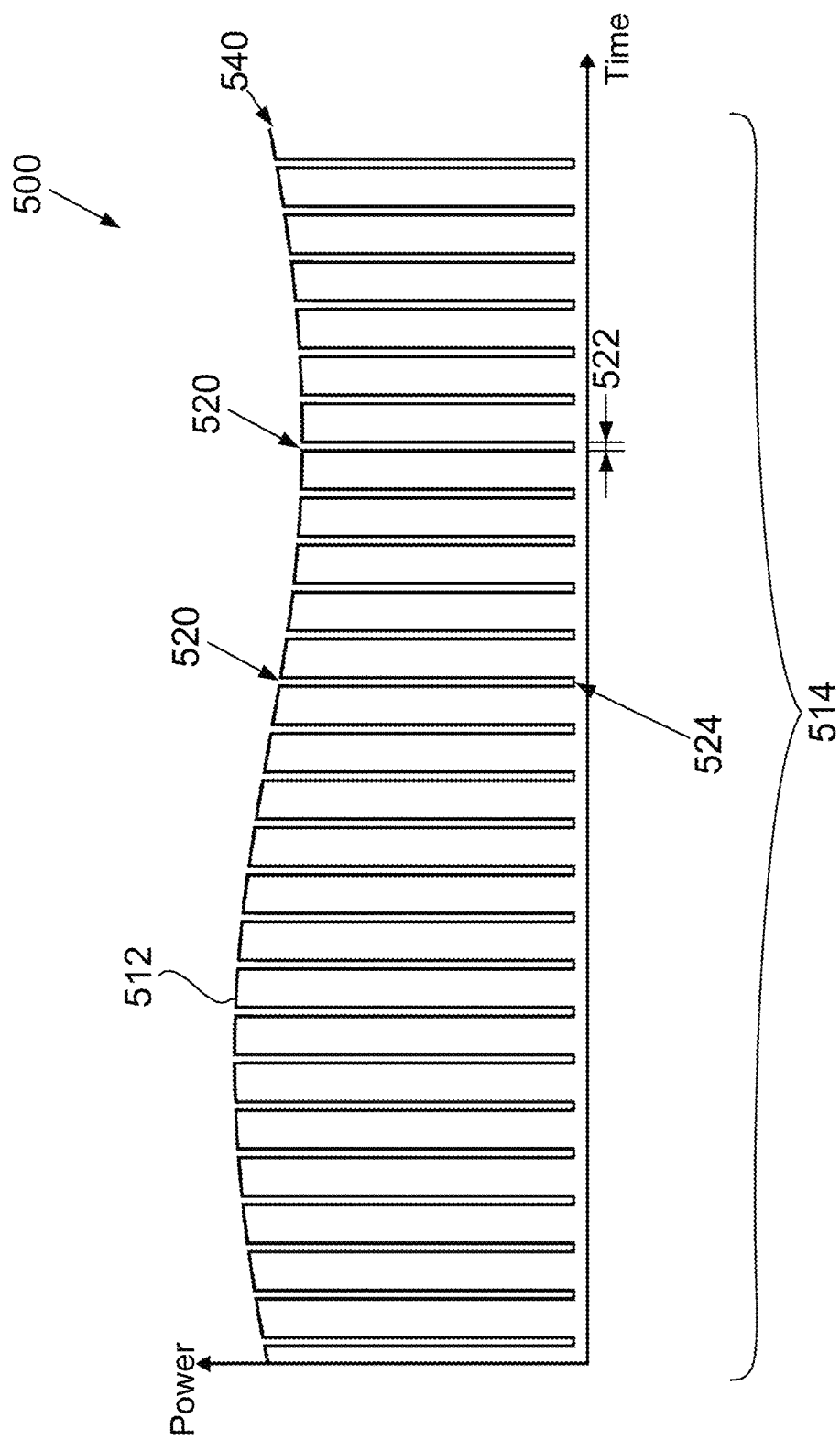
FIG. 5 depicts an alternative transmitted waveform of optical power, in accordance with various embodiments of the present disclosure.

FIG. 5 depicts optical power of an alternative transmitted waveform 500, in accordance with various embodiments of the present disclosure. The optical channel signal with waveform 500 may be transmitted, for example, by transmitter Tx 220a of coherent transceiver 227a in FIG. 2. The transmitted optical channel signal with waveform 500 has, in addition to low-power gaps 520, amplitude modulation pilot tone 540, only one pilot tone period is shown here.

As depicted in FIG. 5, the pilot tone modulation frequency is different from the frequency at which low-power gaps 520 occur (also referred to herein as "gap frequency"). In some embodiments, the pilot tone modulation frequency is lower than frequency of low-power gaps 520. In some other embodiments, the pilot tone modulation frequency may be higher than frequency of low-power gaps 520.

In some embodiments, the frequency of low-power gaps 520 may be variable with time. In some embodiments, low-power gaps 520 may be applied irregularly such that a time interval between neighboring low-power gaps 520 (also referred to herein as a "gap interval") may vary with time. In some embodiments, low-power gaps 520 may be configured to coincide in time and/or be compatible with a signal frame structure. When referring to low power gaps, it should be understood that the power in a low power gap should be substantially below the power outside of the gap. In some embodiments, the powers may differ by a factor of five. Thus, the power in the gap may be one-fifth the power of the other parts of the baseline signal.

Figure 6A:
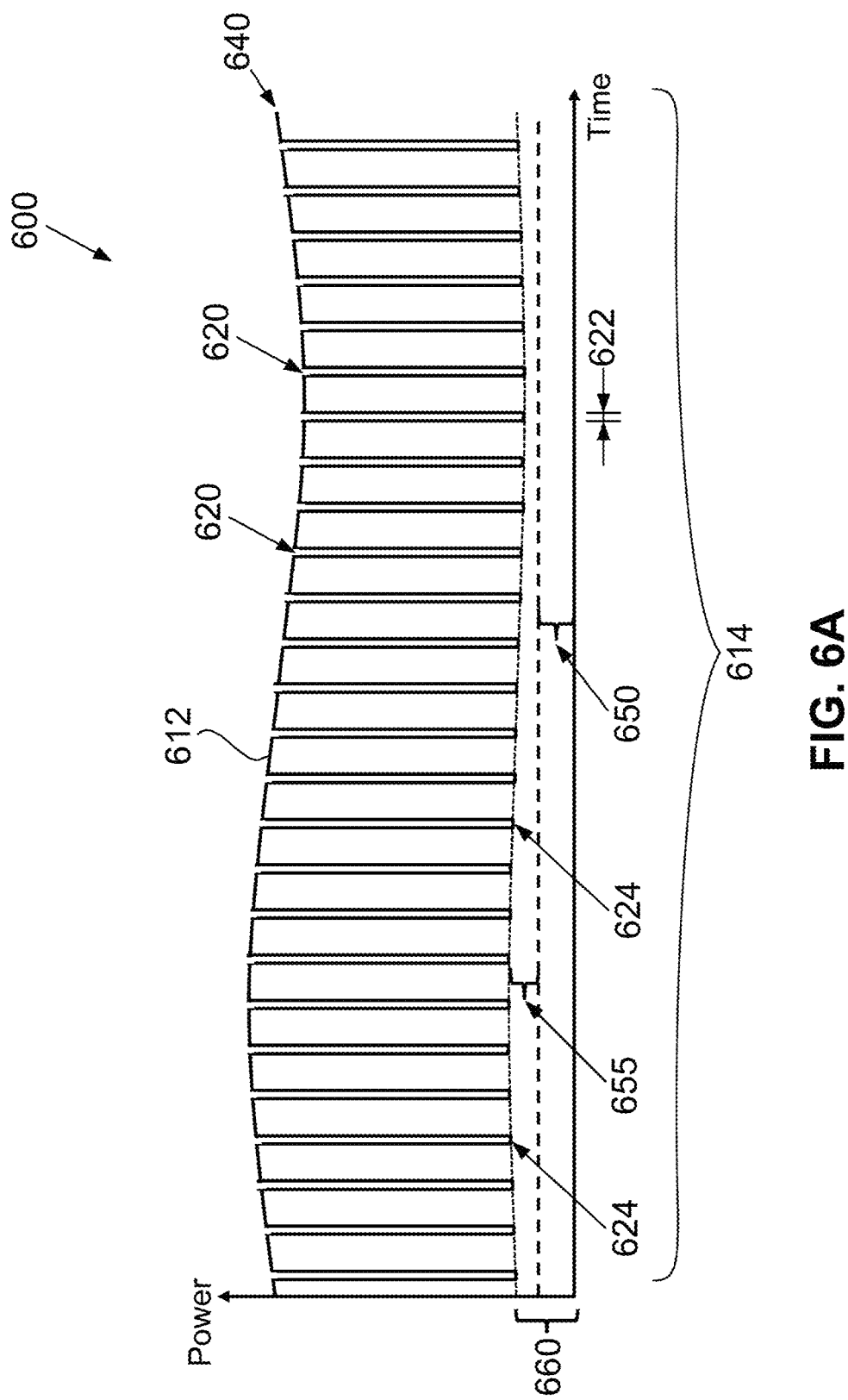
FIG. 6A depicts a received waveform of optical power after the optical signal with waveform of FIG. 5 propagated through the link, in accordance with various embodiments of the present disclosure.

FIG. 6A depicts optical power of a received waveform 600 corresponding to the transmission of waveform 500 through a link such as link 200, in accordance with various embodiments of the present disclosure. Waveform 600 may be received, for example, at receiver Rx 225b in FIG. 2. It should be noted that received waveform 600 is representative of the received signal after equalizations have been applied to mitigate or remove the chromatic dispersion and other linear effects, such as polarization mode dispersion. For example, the chromatic dispersion may be removed at a digital signal processor (DSP) with dispersion equalizer. The chromatic dispersion may be removed using any number of different techniques including frequency domain equalization.

Transmitted gap power 524 is much lower than transmitted signal power 512 outside of low-power gaps 520. For example, transmitted gap power 524 may be about or lower than one third of the transmitted signal power 512. In the illustrated embodiments, transmitted gap power 524 is approximately 0. Gap power 524 may be about or lower than one fifth of the signal power 512. Gap power 524 may be about or lower than 10% of the signal power 512, about or lower than 5% of the signal power 512, between about 5% and about 10% of the signal power 512.

In some embodiments, low-power gaps 520 may be applied periodically at equal gap periods.

The duration of low-power gaps 520, 620—gap time periods 522, 622—may be chosen such that the gap time periods 522, 622 are not too long in order to reduce overhead. If the gap time periods 522, 622 are too long, it may need to take larger dispersion to fill the low-power gap with power at the receiver. For example, the duration of low-power gap 520, 522 may be of the order of a few symbols to minimize overhead.

The received waveform 600 has both pilot tone 640 and low-power gaps 620. When propagating though link 200, the optical signal accumulates both ASE noise 650 and fiber nonlinear noise 655. Therefore, received gap power 624 and received signal power 612 both include ASE noise 650 and nonlinear noise 655. When summed, ASE noise 650 and nonlinear noise 655 represent at least a portion of total noise 660. In the illustrated example, where transmitted gap power 524 is approximately 9, received gap power 624 is largely representative of the summation of ASE noise 650 and nonlinear noise 655.

Figure 6B:
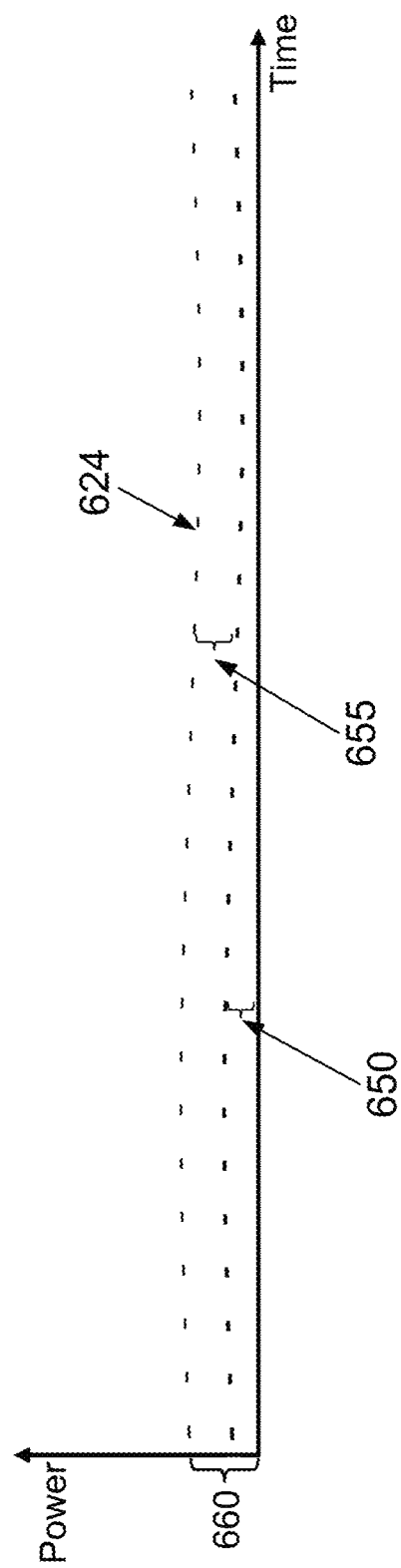
FIG. 6B depicts received gap power detected in low-power gaps of received waveform of FIG. 6A.

FIG. 6B depicts received gap power 624 detected in low-power gaps 620 of received waveform 600. FIG. 6B also depicts levels of ASE noise 650 and nonlinear noise 655 in received gap power 624.

Because ASE noise is generated by optical amplifiers in the link, it is independent from the transmitted signal. Accordingly, ASE noise is not modulated by the pilot tone and remains constant. Nonlinear noise 655 is modulated by the pilot tone. This difference can be used to separately measure the two types of noise.

ASE noise is not modulated by the pilot tone. Accordingly, nonlinear noise 655 may be measured by detecting the amplitude of the pilot tone. To measure the nonlinear noise, the amplitude of the pilot tone is determined from measured received gap power 624.

Detecting power 624 in the low-power gaps 620 provides a measurement of the amplitude of the pilot tone in the received optical signal (waveform 600). The pilot tone modulation depth is fixed by the transmitter. However, the amplitude of the pilot tone in the received optical signal can be measured (as noted above this can be done in the low power gaps). The measured pilot tone amplitude then be used to assist in determining a nonlinear noise level. Total link noise includes both nonlinear noise and ASE noise. Therefore, ASE noise may be determined from total link noise and nonlinear noise. Thus ASE noise and nonlinear noise may be monitored separately. Furthermore, OSNR may be obtained from the ASE noise.

Methods and systems for optical network monitoring and for determining and monitoring of fiber nonlinear noise, ASE noise and OSNR will now be described in further detail.

Figure 7:
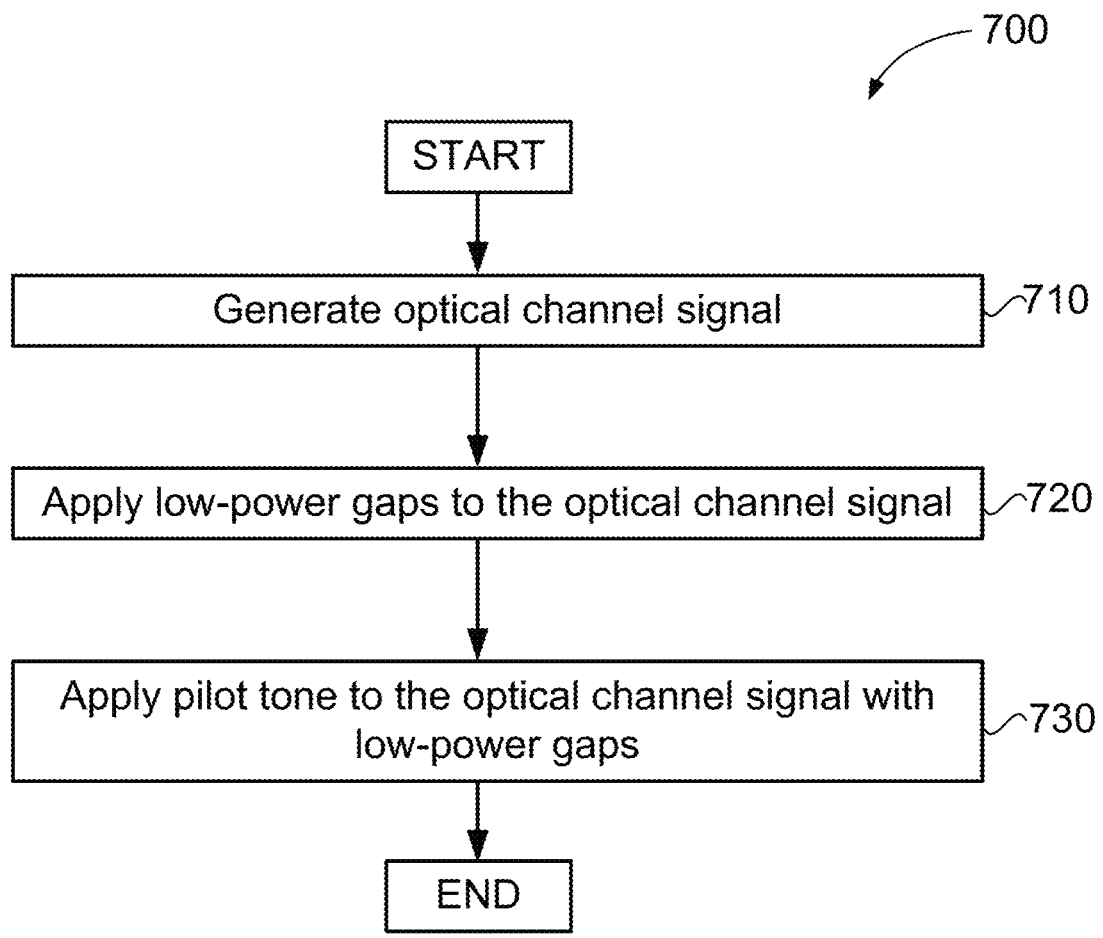
FIG. 7 depicts a flowchart illustrating a method for optical network monitoring, in accordance with various embodiments of the present disclosure.

FIG. 7 is a flowchart illustrating a method 700 for optical network monitoring, in accordance with various embodiments of the present disclosure. Optical channel signal 512 is generated 710 by transmitter Tx 220a (depicted in FIG. 2). During gap time periods 322, low-power gaps 320, 520 are applied 720 to optical channel signal 312. It should be noted that these steps are not necessarily performed sequentially. Low power gaps may be applied in the overhead portion of the frame structure to avoid delaying the delivery of payload information. Thus, the generation of the optical signal may be done in a manner that already includes low power gaps. The modulation of this signal using an AM pilot tone may be performed by the transmitter as a function of the transmission of a signal into a channel.

Pilot tone 540 is then applied to optical channel signal 312 with low-power gaps 320, 520 to obtain transmitted optical channel signal 512. The applied pilot tone 540 has a pilot tone frequency and a pilot tone modulation depth.

Those skilled in the art will appreciate that from the perspective of an outside observer of a transmitter, the transmitter is generating an optical signal having low-power gaps that is modulated in accordance with a pilot tone. This generated signal will have a characteristic modulation but will also have gaps in the signal representative of the lower power gaps.

Figure 8:
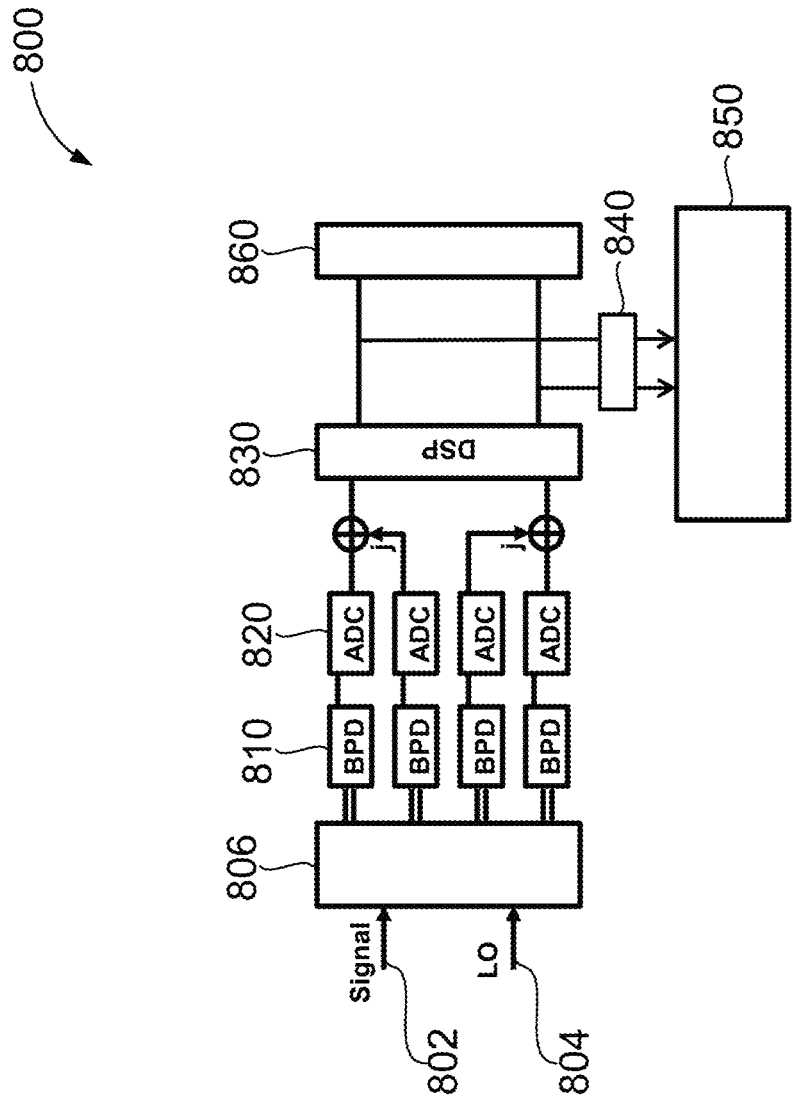
FIG. 8 depicts an apparatus for monitoring the performance of fiber optical network, in accordance with various embodiments of present disclosure.

FIG. 8 depicts an apparatus 800 for monitoring the performance of fiber optical network, in accordance with various embodiments of present disclosure.

The apparatus 800 is a so-called "coherent receiver" and uses an optical local oscillator (LO). The apparatus 800 may be included at least partially in receiver Rx 225a, 225b, and/or may be at least partially included in coherent transceiver 227a, 227b.

The optical signal 802 and local oscillator's signal LO 804 are received at polarization and phase diversity hybrid 806, then the signals are detected by balanced photodetectors (BPD) 810. The output of BPDs 810 is then transmitted to analog-to-digital converters (ADC) 820.

After the signal passes through a digital signal processor (DSP) 830, the signal is transmitted to a gating block 840 and to a symbol decision module 860. In some embodiments an equalizer may serve the function of DSP 830. Those skilled in the art will appreciate that the equalizer can be used to remove linear impairments caused by the propagation of the signal through the link. Such an equalizer may be embodied within a coherent receiver DSP.

The gating block 840 is configured to determine power in low-power gaps 620 of the signal and collect data related to power in low-power gaps 620. The gating block 840 then transmits the data related to gap power in low-power gaps to a monitoring module 850. It should be noted that power, amplitude or both of the signal may be determined and transmitted at any stage in apparatus 800. It should be understood that gating block 840 can be implemented in any of a number of ways, including as a controlled switch.

The monitoring module 850 is configured to monitor performance of fiber optical network. In particular, the monitoring module 850 is configured to determine and monitor ASE noise, nonlinear noise, and OSNR as described herein.

It should be understood that receiver's DSP 830 may include gating block 840 and monitoring module 850.

Figure 9:
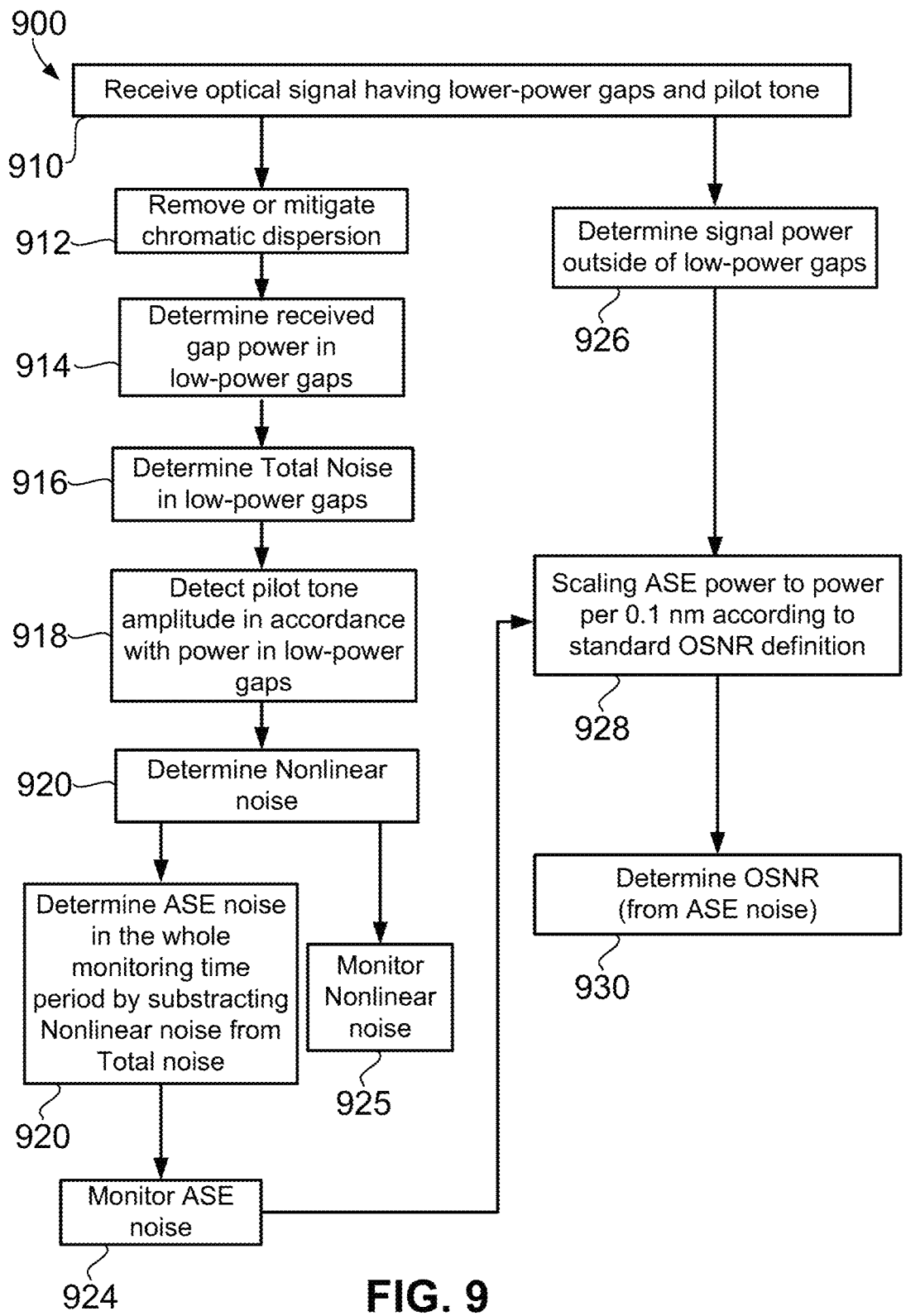
FIG. 9 is a flowchart illustrating another method for optical network monitoring, in accordance with various embodiments of the present disclosure.

FIG. 9 is a flowchart illustrating a method 900 for optical network monitoring, in accordance with various embodiments of the present disclosure.

The receiver, for example receiver Rx 225b, receives 910 optical channel signal 600. The received gap power 624 in low-power gaps 620 is collected and determined. This may be done, for example, at gating block 840. The gating block 840 then transmits gap power 624 in low-power gaps 620. The effects of chromatic dispersion can be removed from the received signal by use of an equalizer or at a DSP as discussed above. The removal of the effects of chromatic dispersion from the overall signal allows the determination 916 of gap power 624 to reflect total noise 660 in low-power gaps 620. The removal of chromatic dispersion effects may also be performed at the same time as correction of linear impairment caused Inter-Symbol Interference (ISI). ISI may also obscure the measurement of total noise 660, so its removal along with the chromatic dispersion effects in advance of noise measurement is beneficial.

To improve detection of low-power gaps 620, chromatic dispersion and other impairments may be mitigated or removed 912. The corrected signal can then be analysed to determine 914 the received gap power 624 in low-power gaps 620, as it is illustrated in FIG. 9. Alternatively, chromatic dispersion may be removed from gap power 624 after determining of received gap power 624 in low-power gaps 620.

Although nonlinear noise may be present in received signal 600, it may be hard to distinguish nonlinear noise without removing chromatic dispersion from the received signal. The removal of other linear impairments is also of value. In order to determine nonlinear noise level in low-power gaps 620, dispersion equalization should be applied.

For example, if signal spectral width is 0.3 nm, after propagation through 80 km of standard single mode (SSMF) fiber with about 17 ps/nm/km chromatic dispersion coefficient, a symbol spread may be about 408 ps. This corresponds to more than 10 symbol duration. If the gap time period is 5 symbols long, then, in dispersion uncompensated links, low-power gap may only show in the waveform in the first span. For the remaining of the link, low-power gap may become undistinguishable in the optical signal. However, nonlinear interferences in the link happen all the time. This explains why the low power gaps can be used to monitor fiber nonlinear noise: with chromatic dispersion, the zero power gaps are actually filled with power spread from the neighboring symbols, there is no gaps in the signal for the majority of the propagation.

Therefore, the accumulated chromatic dispersion needs to be removed at the receiver in order to recover the signal with the low-power gaps, along with nonlinear noise. The impact of removing the chromatic dispersion from the signal is illustrated in FIG. 10.

Figure 10:
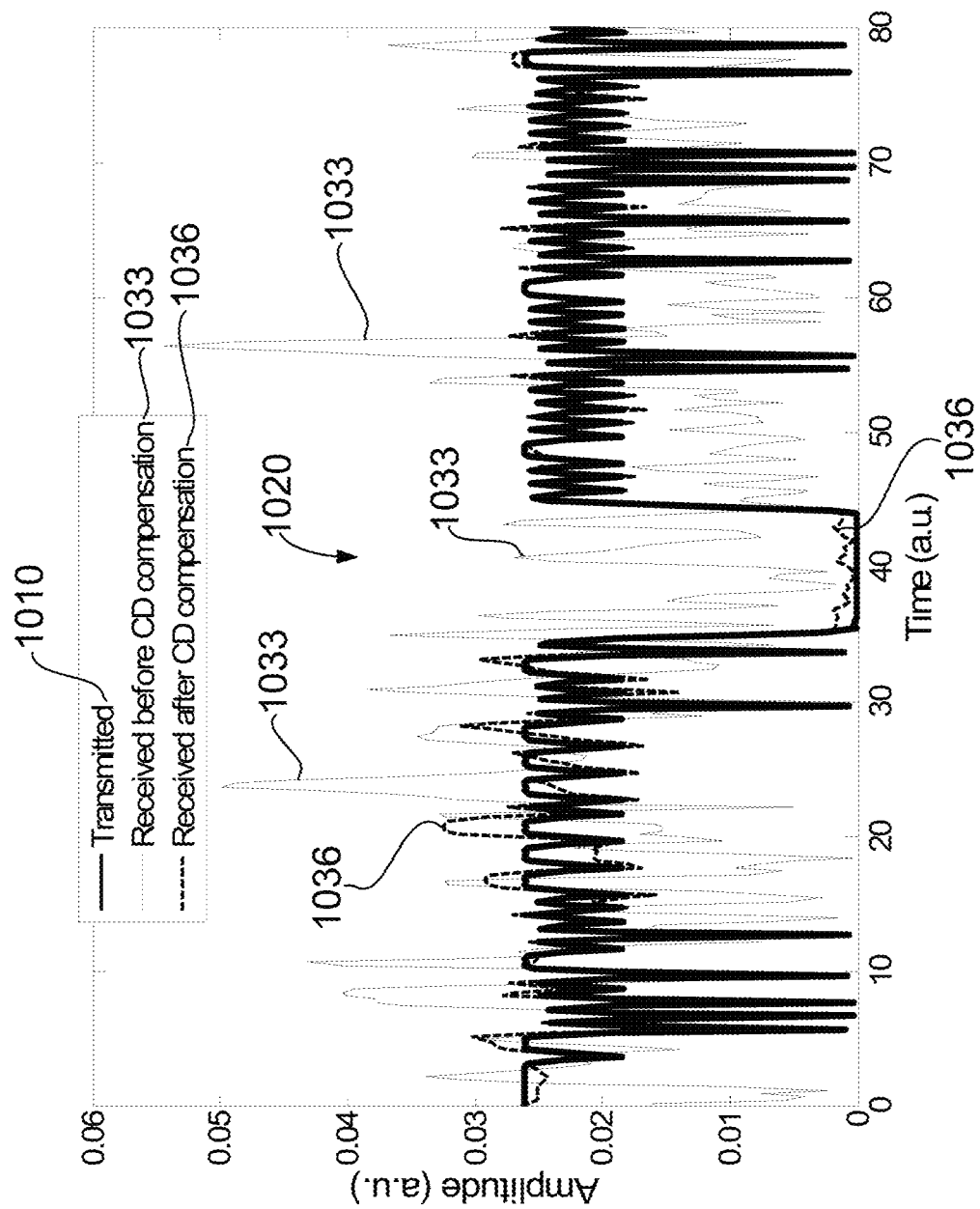
FIG. 10 depicts simulation results for 34 Gbaud Quadrature Phase Shift Keying (QPSK) signal with a gap of 10 symbols.

FIG. 10 depicts simulation results for 34 Gbaud Quadrature Phase Shift Keying (QPSK) signal with a gap of 10 symbols. In the simulation, the signal propagated through 20 spans of SSMF with 0 dBm launch power. The signal experienced dispersion, as well as SPM. In FIG. 10, a thick solid line 1010 represents an initial amplitude waveform with no power in gap 1020. A narrower line 1033 represents a waveform after single channel nonlinear propagation (20 spans of 80 km SSMF, 0 dBm launch power) without removing dispersion. There is no low-power gap in the waveform if chromatic dispersion is not removed. A dashed line 1036 represents a waveform after single channel nonlinear propagation with removed chromatic dispersion. After the chromatic dispersion is removed, the low-power gap reappears, and the power in the low-power gap is not zero due to SPM noise. No ASE noise was added in the simulation.

Referring again to FIG. 9, after total noise 660 has been determined 916 in low-power gaps 620, the amplitude of the pilot tone can be determined 918 in accordance with gap power 624. In some embodiments, fast Fourier transform (FFT) algorithms may be used to detect the pilot tone and its modulation depth. If the pilot tone has a known frequency, other algorithms may be used. For example, Goertzel algorithm may be used.

To determine the amplitude of the pilot tone modulation from gap power 624, low-power gaps 520, 620 are applied at a gap frequency that may be different from the pilot tone modulation frequency. This permits to have sufficient data in order to determine the pilot tone amplitude. The gap frequency may be lower or higher than the pilot tone modulation frequency. As noted above, low-power gaps 520 may be irregular such that a time interval between neighboring low-power gaps 520 may vary with time.

The nonlinear noise power may then be determined by converting the pilot tone amplitude/amplitude to power, using known modulation depth.

A scaling factor k may be applied to pilot tone modulation depth to determine 920 nonlinear noise according to the following formula:

$$P_{nonASE} = kP_{PT},\quad(2)$$

where $P_{nonASE}$ is nonlinear noise power 655, $P_{PT}$—is gap power 624.

The scaling factor k may be inversely proportional to pilot tone modulation depth.

ASE noise 650 may then be determined 920 based on the following formula:

$$P_{ASE} = P_t - P_{nonASE},\quad(3)$$

where $P_t$ is total noise in low-power gaps. If the transmitted gap power 524 was approximately 0, then $P_t$ is equal to received gap power 624 measured in low-power gaps 620.

The monitoring module 850 may monitor performance of fiber optical network and its equipment by monitoring 924 ASE noise 650 and by monitoring 925 nonlinear noise. Data may be collected during monitoring time period 614.

It should be noted that monitoring time period 614 may depend on the application. Monitoring time period 614 may be long enough so that pilot tone amplitude may be determined accurately. Because nonlinearity is generally static or slowing changing (often as a result of loading and channel power) monitoring time period 614 can be set to a value that allows for treating the nonlinearity as static. Hence, the monitoring of the nonlinear noise does not have to be very fast. For example, monitoring time period 614 of 1 second may provide enough statistics to calculate noises using data collected for low-power gap.

OSNR may be determined 930 as follows. First, ASE noise 650 for the whole monitoring time period 614 may be determined 924. Signal power 612 outside of the low-power gaps 620 may also be determined 926. It should be understood that in some embodiments, the signal power of the signal inclusive of the gaps may be determined in place of the signal power 612 outside of the low power gaps. ASE noise power needs to be scaled 928 to power per 0.1 nm according to standard OSNR definition. OSNR may be then determined from ASE noise 650 for the optical channel signal.

A portion of gap power 624, induced by fiber nonlinearity, is proportional to the signal power around the low-power gap. Therefore, if the signal power is modulated by pilot tone 640, then the nonlinear noise power is also modulated by pilot tone 640. In order to verify that nonlinear noise 655 is part of transmitted gap power 624 and that nonlinear noise 655 is modulated by pilot tone 640, the following computer-based simulations have been performed.

Figure 11:
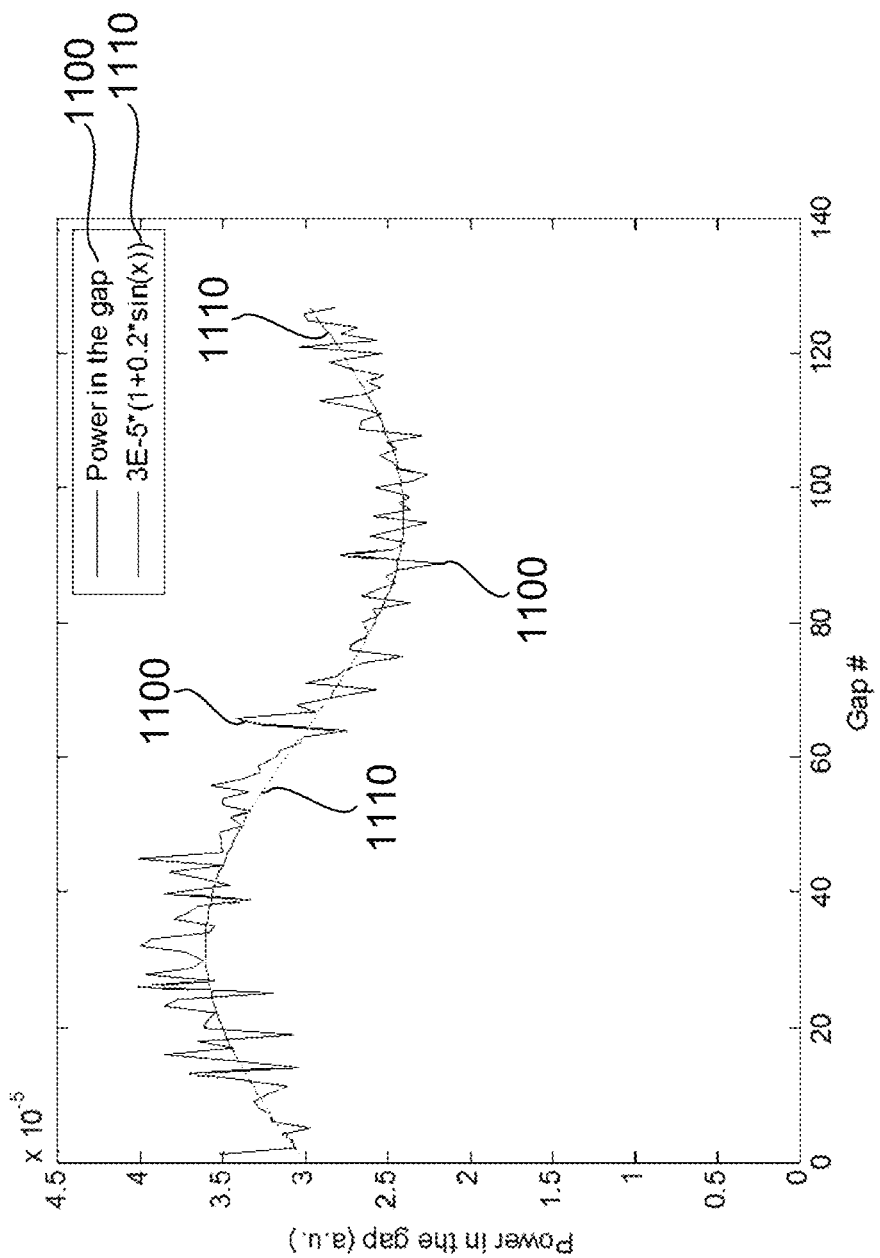
FIG. 11 depicts simulated nonlinear noise power in a low-power gap as a function of low-power gaps in a waveform with self-phase modulation (SPM)

FIG. 11 depicts simulated nonlinear noise power 1100 in low-power gap as a function of low-power gaps in a waveform with self-phase modulation (SPM). Only the signal channel was simulated in the nonlinear propagation through 20 spans of 80 km SSMF fiber. Random data symbols were divided into blocks, each block had 2560 symbols, and there were 128 blocks. In each block, the power of 10 symbols was set to zero at Tx. Gap periods 522 were 10 symbols, and the gap interval (time interval between the low-power gaps) was 2560 symbols. For the pilot tone, a modulation of 20% was used, which was significantly higher than what would be used in real systems. The pilot tone frequency was chosen so that there is one period in the entire simulation length (128 blocks of 2560 symbols). There was no ASE noise in the simulation, so the noise power in the low-power gap was nonlinear noise only.

FIG. 11 also depicts a fitting sinusoid curve 1110 with 20% modulation depth. FIG. 11 shows that the nonlinear noise power in the low-power gaps was modulated by the pilot tone, and the modulation depth of the received pilot tone was the same as modulation depth of the transmitted pilot tone.

Figure 12:
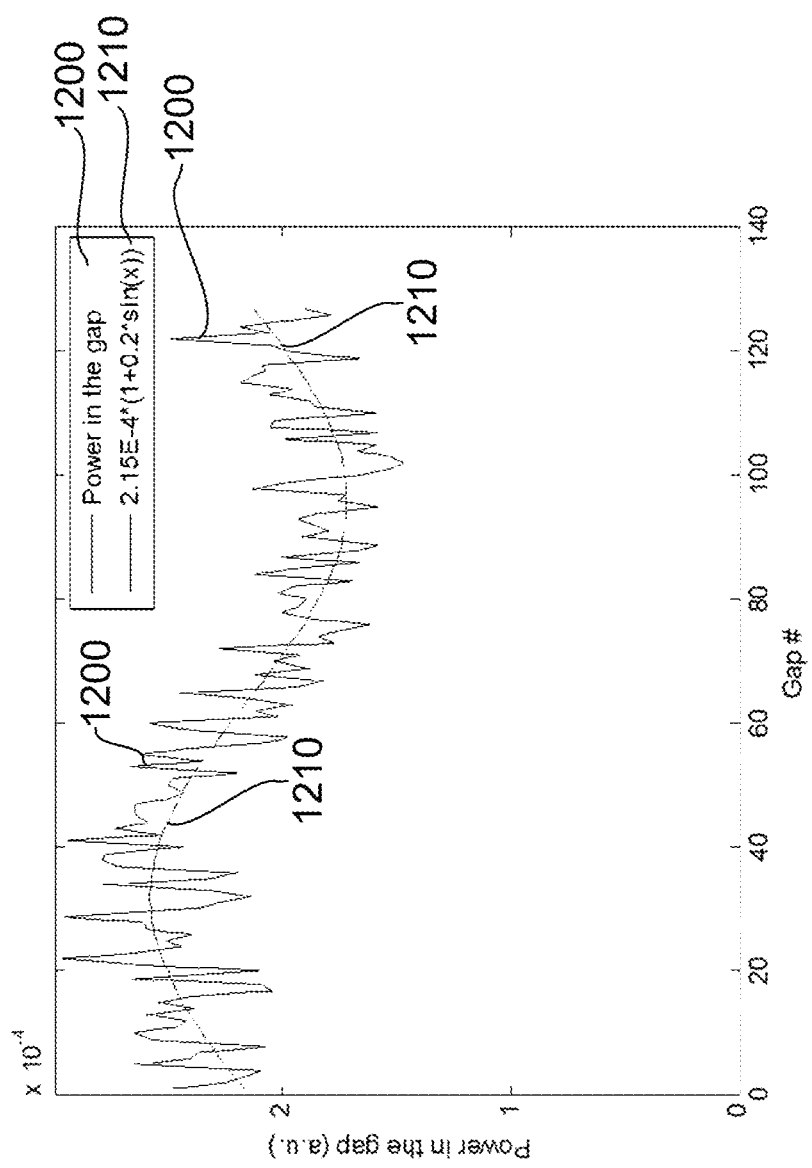
FIG. 12 depicts simulated nonlinear noise power in low-power gaps as a function of low-power gaps in a waveform with SPM and cross-phase modulation (XPM).

FIG. 12 depicts simulated nonlinear noise power 1200 in low-power gaps as a function of low-power gaps in a waveform with SPM and XPM. The simulation parameters were similar to simulations in FIG. 11, except that there were several adjacent channels to introduce cross-phase modulation (XPM). Gap periods 522 were 10 symbols, and the gap interval (time interval between the low-power gaps) was 320 symbols. The nonlinear noise (SPM and XPM) in the low-power gap was also modulated by the pilot tone with the same modulation depth as in the transmitted signal. FIG. 12 also depicts a fitting sinusoid curve 1210 with 20% modulation depth.

The simulations depicted in FIG. 11 and FIG. 12 show that it is possible to monitor the nonlinear noise by detecting the pilot tone amplitude using the power measured in low-power gaps of the optical channel signal.

In at least one embodiment, there is a non-transitory computer readable medium with computer executable instructions stored thereon that, when executed by a processor, cause the processor to perform methods described herein, such as method 700 and method 900. In some embodiments, the instructions, executed by a processor, may cause the processor to: determine a gap power in low-power gaps of an optical channel signal, determine a pilot tone amplitude based on the gap power; and monitor performance of optical network equipment based on the pilot tone determined in low-power gaps of the optical channel signal.

In some embodiments, the processor may be configured to determine at least one of a fiber nonlinear noise and an amplifier spontaneous emission separately. In some embodiments, the processor may be configured to determine an optical signal-noise-ratio based on the pilot tone modulation depth determined from the gap power detected in the low-power gaps of the optical channel signal.

It is to be understood that the operations and functionality of the disclosed systems and apparatuses may be achieved by hardware-based, software-based, firmware-based elements and/or combinations thereof. Such operational alternatives do not, in any way, limit the scope of the present disclosure. Where a method comprising a series of operations is implemented by a computer, a processor operatively connected to a memory, or a machine, those operations may be stored as a series of instructions readable by the machine, processor or computer, and may be stored on a non-transitory, tangible medium.

It will also be understood that, although the inventive concepts and principles presented herein have been described with reference to specific features, structures, and embodiments, it is clear that various modifications and combinations may be made without departing from the such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

The invention claimed is:

1. A method for monitoring performance of optical networks comprising:
receiving an optical channel signal, the optical channel signal comprising:

low-power gaps having a power no greater than approximately one fifth of a signal power of the optical channel signal outside the low-power gaps, and an amplitude modulation pilot tone having a pilot tone modulation frequency; and monitoring performance of a fiber optical network equipment based on the power in the low power gaps and the amplitude of the pilot tone detected from the gap power in the low-power gaps of the received optical channel signal.

2. The method of claim 1, wherein the low-power gaps are detected at a gap frequency, and the pilot tone modulation frequency is different from the gap frequency.

3. The method of claim 2, wherein the pilot tone modulation frequency is lower than the gap frequency.

4. The method of claim 1, further comprising mitigating chromatic dispersion from the optical channel signal before detecting a pilot tone modulation depth.

5. The method of claim 1, wherein the gap power is between about 5% and about 10% of the signal power of the optical channel signal.

6. The method of claim 1, wherein the gap power is about or lower than 5% of the signal power of the optical channel signal.

7. The method of claim 1, wherein the amplitude modulation pilot tone and a pilot tone modulation depth are detected using a fast Fourier transform algorithm.

8. The method of claim 1, wherein the monitoring performance of the fiber optical network equipment comprises monitoring an optical signal-to-noise ratio of the optical channel signal.

9. The method of claim 1, wherein the monitoring performance of a fiber optical network equipment based on the pilot tone amplitude detected from the gap power in the low-power gaps of the received optical channel signal comprises:

mitigating linear impairments, including chromatic dispersion, from the optical channel signal; and monitoring an optical signal-noise-ratio of the optical channel signal based on the pilot tone modulation amplitude detected in the low-power gaps of the optical channel signal with the removed chromatic dispersion.

10. The method of claim 9, further comprising determining the optical signal-noise-ratio by using data of received optical channel signal outside of the low-power gaps.

11. The method of claim 1, wherein monitoring performance of the fiber optical network equipment comprises monitoring of an amplifier spontaneous emission.

12. The method of claim 1, wherein monitoring performance of the fiber optical network equipment comprises monitoring of a fiber nonlinear noise.

13. A method for monitoring performance of optical networks comprising:

receiving an optical channel signal, the optical channel signal comprising:

low-power gaps, having a power no greater than approximately one fifth of a signal power of the optical channel signal outside the low-power gaps, and an amplitude modulation pilot tone having a pilot tone modulation frequency;

mitigating the effects of linear impairments from the optical channel signal; and monitoring an optical signal-noise-ratio of the optical channel signal based on a pilot tone modulation depth detected in low-power gaps of the optical channel signal with removed chromatic dispersion.

14. The method of claim 13, wherein the low-power gaps are detected at gap frequency and the pilot tone modulation frequency is lower than the gap frequency.

15. The method of claim 13, wherein the gap power is between 0 and about 5% of the signal power of the optical channel signal power.

16. The method of claim 13, further comprising detecting the pilot tone and pilot tone amplitude using fast Fourier transform.

17. The method of claim 13, further comprising determining the optical signal-noise-ratio by using data of received optical channel signal outside of the low-power gaps.

18. The method of claim 13, further comprising determining an amplifier spontaneous emission.

19. An optical network monitoring apparatus comprising:

a receiver configured to receive an optical channel signal comprising:

low-power gaps having a power no greater than approximately one fifth of a signal power of the optical channel signal outside the low-power gaps, and an amplitude modulation pilot tone having a pilot tone modulation frequency; and a processor configured to monitor performance of an optical network equipment based on a pilot tone amplitude detected from the gap power of the received optical channel signal.

20. The apparatus of claim 19, wherein the receiver is a coherent receiver.

21. The apparatus of claim 19, wherein the processor is configured to mitigate the effects of chromatic dispersion from the optical channel signal.

22. The apparatus of claim 19, wherein the amplitude modulation pilot tone and a pilot tone modulation depth are determined with a fast Fourier transform algorithm.

23. A non-transitory computer readable medium with computer executable instructions stored thereon that, when executed by a processor, cause the processor to:

determine a gap power in low-power gaps of an optical channel signal, the optical channel signal comprising:

the low-power gaps having a power no greater than approximately one fifth of a signal power of the optical channel signal outside the low-power gaps, and an amplitude modulation pilot tone having a pilot tone modulation frequency;

determine a pilot tone amplitude based on the gap power; and monitor performance of an optical network equipment based on a pilot tone modulation depth determined in low-power gaps of the optical channel signal.

24. The non-transitory computer readable medium of claim 23, wherein the processor is configured to determine at least one of a fiber nonlinear noise and an amplifier spontaneous emission separately.

25. The non-transitory computer readable medium of claim 23, wherein the processor is configured to determine an optical signal-noise-ratio based on the pilot tone amplitude determined from the gap power detected in the low-power gaps of the optical channel signal.

* * * * *